United States Patent
Harish et al.

(10) Patent No.: US 12,294,748 B2
(45) Date of Patent: *May 6, 2025

(54) MULTIPLEXED PLACE SHIFTING DEVICE

(71) Applicant: Sling Media L.L.C., Foster City, CA (US)

(72) Inventors: Yashaswini Harish, Foster City, CA (US); Ramgopal Madduluri, Foster City, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,902

(22) Filed: Jun. 30, 2023

(65) Prior Publication Data

US 2023/0345062 A1   Oct. 26, 2023

Related U.S. Application Data

(63) Continuation of application No. 15/922,711, filed on Mar. 15, 2018, now Pat. No. 11,729,442.

(Continued)

(51) Int. Cl.
| | |
|---|---|
| *H04N 21/2365* | (2011.01) |
| *H04L 65/60* | (2022.01) |
| *H04L 65/613* | (2022.01) |
| *H04L 65/80* | (2022.01) |
| *H04N 19/40* | (2014.01) |

(Continued)

(52) U.S. Cl.
CPC ......... *H04N 21/2365* (2013.01); *H04L 65/60* (2013.01); *H04L 65/613* (2022.05); *H04L 65/80* (2013.01); *H04N 19/40* (2014.11); *H04N 21/2665* (2013.01); *H04N 21/4316* (2013.01); *H04N 21/43615* (2013.01);

(Continued)

(58) Field of Classification Search
CPC .............. H04N 21/2365; H04N 19/40; H04N 21/2665; H04N 21/4316; H04N 21/43615; H04N 21/440218; H04N 21/44209; H04N 21/44245; H04N 21/4622; H04L 65/60; H04L 65/613; H04L 65/80; H04L 65/752
See application file for complete search history.

(56) References Cited

U.S. PATENT DOCUMENTS

| | | | |
|---|---|---|---|
| 9,877,046 B2 * | 1/2018 | Tourapis | H04N 21/2383 |
| 2007/0204302 A1 * | 8/2007 | Calzone | H04N 7/17318 |
| | | | 725/41 |

(Continued)

*Primary Examiner* — Francis Geroleo
(74) *Attorney, Agent, or Firm* — KW Law, LLP

(57) ABSTRACT

A place shifting device and a method for operating the same are provided. The place shifting device, for example, may include, but is not limited to, a communication system configured to receive a plurality of sources of media, a multiplexed channel transcoder configured to multiplex video from at least two of the plurality of sources of media into a single channel, and a processor communicatively coupled to the communication system and the multiplexed channel transcoder, the processor configured to determine the at least two of the plurality of sources of media, transcode, via the multiplexed channel transcoder, the determined video from the at least two of the plurality of sources of media into the signal channel, and transmit, via the communication system, the single channel to a remote electronic device.

15 Claims, 4 Drawing Sheets

Related U.S. Application Data

(60) Provisional application No. 62/611,967, filed on Dec. 29, 2017.

(51) Int. Cl.

| | |
|---|---|
| *H04N 21/2665* | (2011.01) |
| *H04N 21/431* | (2011.01) |
| *H04N 21/436* | (2011.01) |
| *H04N 21/4402* | (2011.01) |
| *H04N 21/442* | (2011.01) |
| *H04N 21/462* | (2011.01) |

(52) U.S. Cl.
CPC ............... *H04N 21/440218* (2013.01); *H04N 21/44209* (2013.01); *H04N 21/44245* (2013.01); *H04N 21/4622* (2013.01)

(56) References Cited

U.S. PATENT DOCUMENTS

| | | | |
|---|---|---|---|
| 2011/0099286 A1* | 4/2011 | Krikorian | H04N 19/61 709/231 |
| 2011/0099571 A1* | 4/2011 | Lucas | H04H 60/31 725/19 |
| 2013/0024901 A1* | 1/2013 | Sharif-Ahmadi | H04N 21/43615 725/114 |
| 2015/0130897 A1* | 5/2015 | D'Amato Damato | H04N 13/194 348/43 |
| 2015/0201198 A1* | 7/2015 | Marlatt | H04N 19/124 375/240.03 |
| 2016/0173935 A1* | 6/2016 | Naik Raikar | H04N 21/4316 725/110 |
| 2016/0261912 A1 | 9/2016 | Gratton | |
| 2018/0160192 A1* | 6/2018 | Wu | H04N 21/4302 |

\* cited by examiner

100

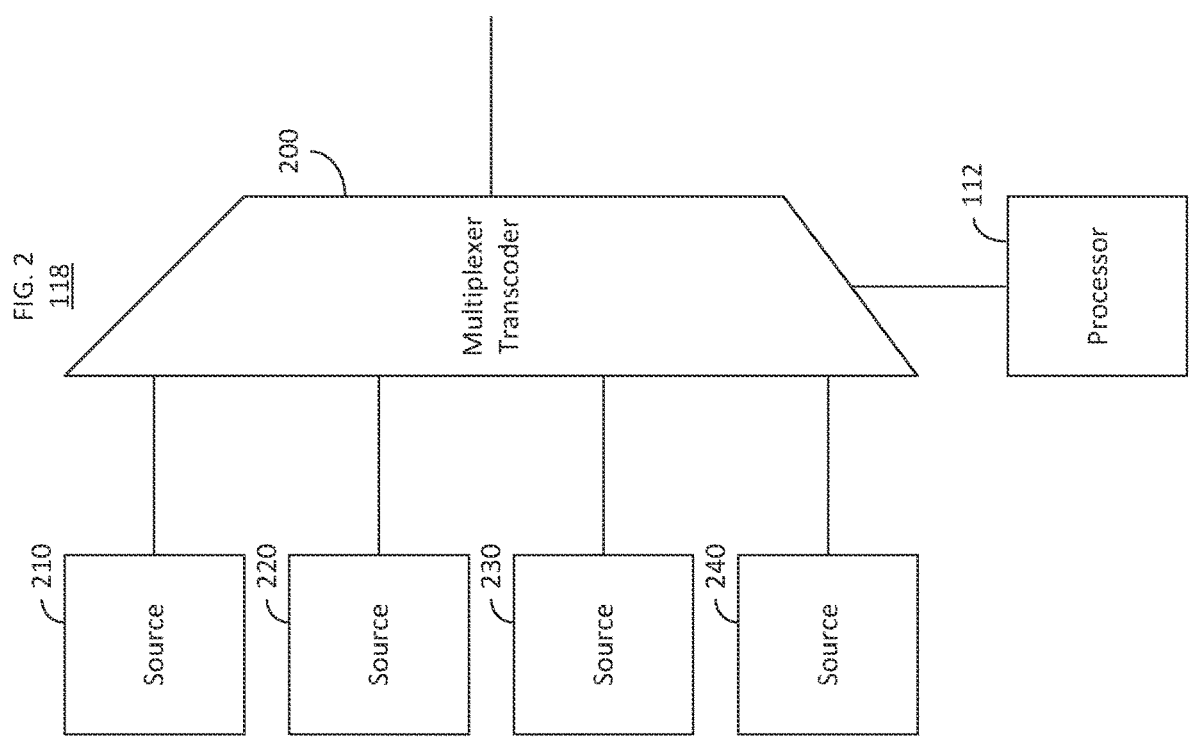

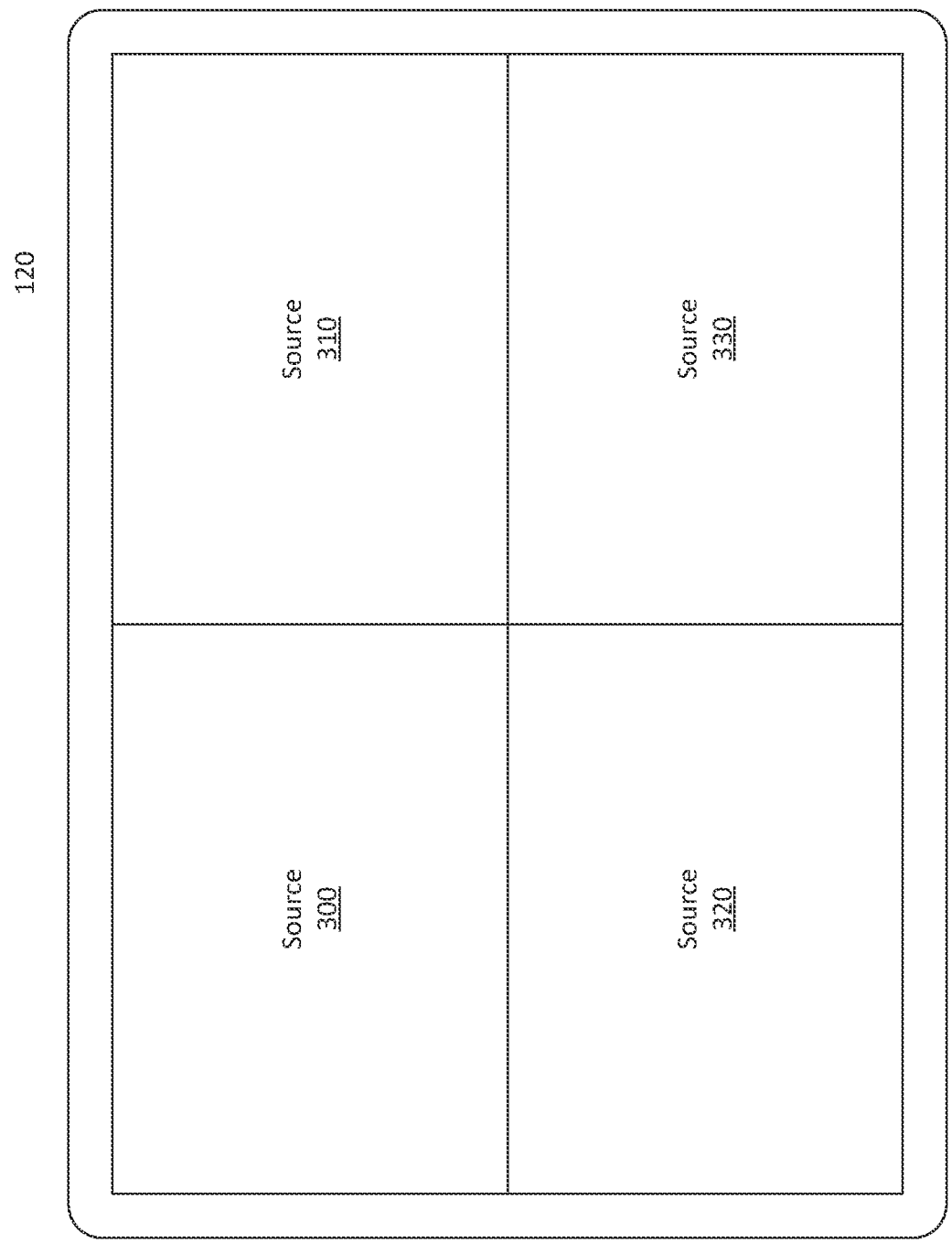

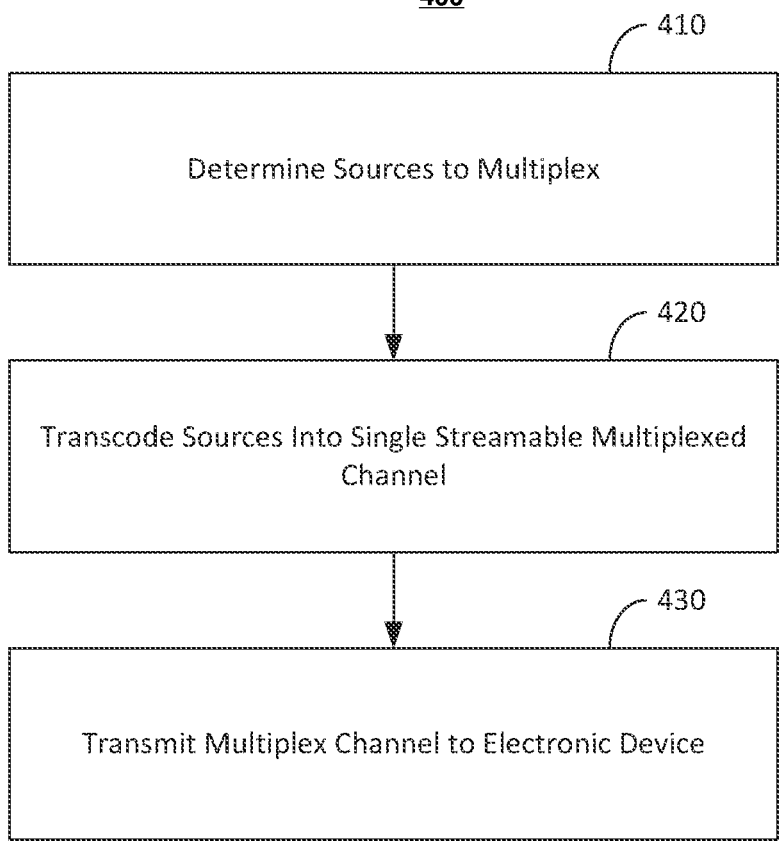

MULTIPLEXED PLACE SHIFTING DEVICE

PRIORITY

This application is a continuation of U.S. patent application Ser. No. 15/922,711 filed on Mar. 15, 2018 and claims priority to U.S. Provisional Patent Application Ser. No. 62/611,967 filed on Dec. 29, 2017, both of which are incorporated herein by reference.

TECHNICAL FIELD

The following relates to place shifting devices, and more particularly to transcoding a multiplex channel on a place shifting device.

BACKGROUND

Place shifting devices are often used to stream media from a first location, such as a set-top box in a user's home, to a second location, such as a user's cellular phone, or a user's office in another building. Many home users operate on networks which have a large bandwidth while downloading content, but have a relatively small amount of bandwidth available to upload content. The relatively small bandwidth available to upload content limits the quality of the place shifted content and can limit the features available to the user.

SUMMARY

In one embodiment, for example, a place shifting device is provided. The place shifting device may include, but is not limited to, a communication system configured to receive a plurality of sources of media, a multiplexed channel transcoder configured to multiplex video from at least two of the plurality of sources of media into a single channel, and a processor communicatively coupled to the communication system and the multiplexed channel transcoder, the processor configured to determine the at least two of the plurality of sources of media, transcode, via the multiplexed channel transcoder, the determined video from the at least two of the plurality of sources of media into the signal channel, and transmit, via the communication system, the single channel to a remote electronic device.

In another embodiment, for example, a method of operating a place shifting device is provided. The method may include, but is not limited to, receiving, via a communication system, a plurality of sources of media, selecting, by a processor communicatively coupled to the communication system, at least two of the plurality of sources of media, transcoding, by a multiplexed channel transcoder, video from the selected at least two of the plurality of sources of media into a single channel, and transmitting, via the communication system, the single channel to a remote electronic device.

DESCRIPTION OF THE DRAWING FIGURES

Exemplary embodiments will hereinafter be described in conjunction with the following drawing figures, wherein like numerals denote like elements.

FIG. 2 is a block diagram of the multiplexed channel transcoder, in accordance with an embodiment;

FIG. 3 illustrates an exemplary electronic device receiving the multiplexed channel, in accordance with an embodiment; and FIG. 4 is a flow diagram illustrating a method of operating a multiplexed channel place shifting system, in accordance with an embodiment.

DETAILED DESCRIPTION

Figure 1:
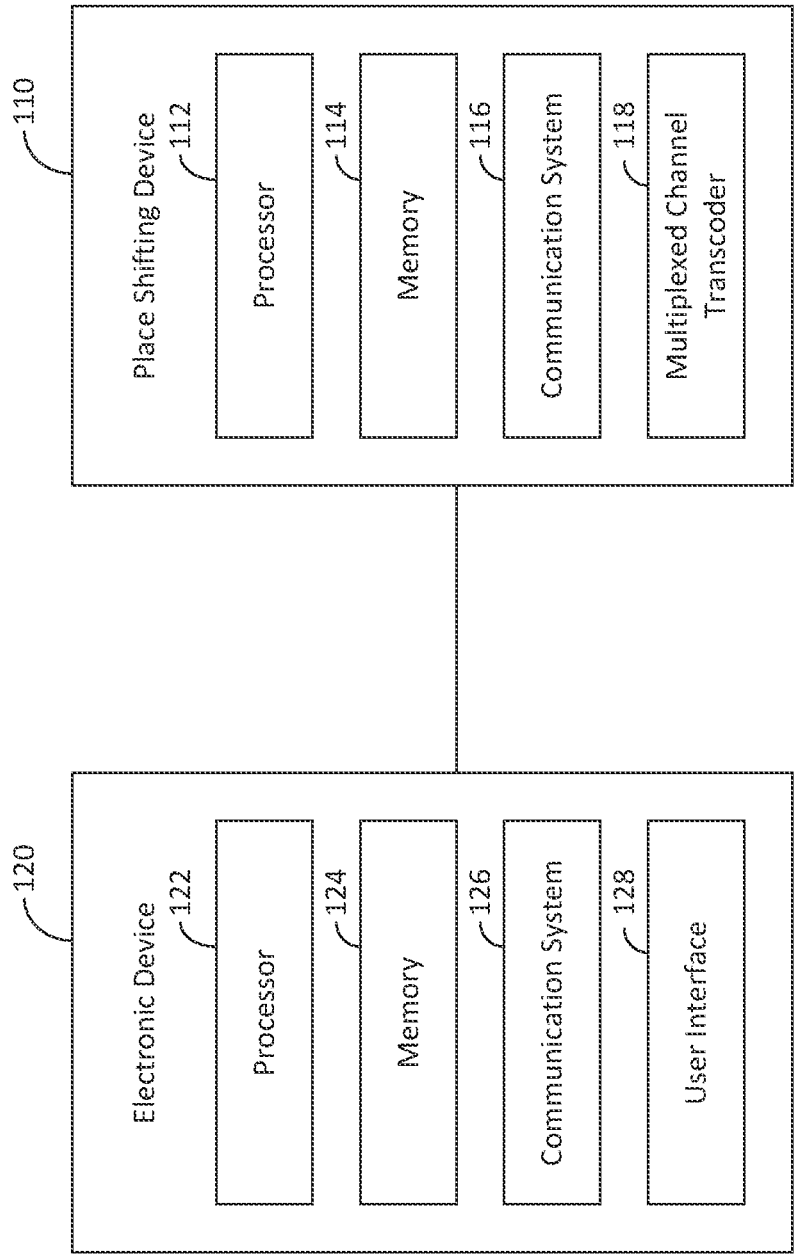
FIG. 1 is a block diagram of a multiplexed channel place shifting system in accordance with an embodiment.

According to various exemplary embodiments, a multiplexed channel place shifting system and a method for controlling the same are provided. The multiplexed channel place shifting system combines video data from multiple sources into a single streamable channel. The streamable channel reduces the bandwidth consumed from streaming multiple sources, thereby allowing the quality of the video to increase.

FIG. 1 is a block diagram of a multiplexed channel place shifting system 100 in accordance with an embodiment. The multiplexed channel place shifting system 100 includes a place shifting device 110 which place shifts media to an electronic device 120. Generally, place shifting refers to shifting the viewing location of television or other media content from one place to another. For example, the place shifting device 110 may be a home television, a television receiver, a set top box (STB), a digital video recorder (DVR), or the like. The electronic device 120 may be a cellular phone, a tablet computer, a desktop computer, a laptop computer, a different television, or to any other media player where network access can be obtained. The electronic device 120 may be located in a different room, a different building or any other remote place that is nevertheless accessible via a local area and/or wide area network.

The place shifting device 110 includes at least one processor 112 and a memory 114. The processor 112 may be a central processing unit (CPU) a graphics processing unit (GPU), an application specific integrated circuit (ASIC), a microcontroller, a field programmable gate array (FPGA), or any other logic circuit or combination thereof. The memory 114 may be any combination of volatile and non-volatile memory. In one embodiment, for example, a portion of the memory 114 may be a cloud based memory. In other words, the place shifting device 110 may access one or more remote memory devices for source content, as discussed in further detail below.

The places shifting device 110 further includes a communication system 116. The communication system 116 may utilize using any wired or wireless communication system, including, but not limited to, cellular, satellite, cable, antenna systems, WIFI, Bluetooth, ZigBee, a local area network (LAN), a wide area network (WAN), or the like and any combination thereof. The communication system 116 may receive source data from, for example, a cable television provider, a satellite television provider, an analog or digital antenna, the internet, or the like, or any combination thereof. The source data is streamed via the communication system 116 to the electronic device 120, as discussed in further detail below.

The place shifting device 110 further includes a multiplexed channel transcoder 118. As discussed in further detail below, the multiplexed channel transcoder 118 transcodes content from multiple sources into a single streamable channel. By transcoding multiple sources into a single streamable channel, the required bandwidth to transmit the multiplexed channel is reduced relative to other systems which would separately encode and separately transmit multiple channels. Furthermore, as all of the content is transcoded into a single channel, the process of adjusting the quality of the multiplexed channel (i.e., the resolution, bitrate and the like) to fit the available bandwidth is simpler than separately adjusting the quality of multiple channels which are transcoded separately.

The multiplexed channel may be used, for example, to show multiple television channels at once. A typical use of the multiplexed channel may be to view multiple sporting events simultaneously. However any channel of any type and content may be part of the multiplexed channel. The multiplexed channel may also be used as part of a channel guide. In other words, content from multiple channels may be displayed on the multiplex channel and a user of the electronic device 120 may then select one or more of those channels to view.

The multiplexed channel may be built by the user. For example, a user can manually select multiple channels which may be streamed simultaneous. However, the place shifting device 110 may also build a multiplexed channel. For example, the place shifting device 110 may pick multiple channels to stream based upon a user's viewing history, trending sources, breaking news, and the like.

The electronic device 120 includes a processor 122, a memory 124, a communication system 126 and a user interface 128. The processor 122 may be a central processing unit (CPU), a graphics processing unit (GPU), an application specific integrated circuit (ASIC), a microcontroller, a field programmable gate array (FPGA), or any other logic circuit or combination thereof. The memory 124 may be any combination of volatile and non-volatile memory. The communication system 136 may utilize any wired or wireless protocol, including, but not limited to, satellite, cellular, WIFI, Bluetooth, ZigBee, a LAN, any other form of WAN, or the like, or any combination thereof. The user interface 128 may include, but is not limited to a display to display the streaming channel, a speaker to output audio and an input system to allow a user to change or select a channel or send commands to the place shifting device 110. The input system may be, for example, a touch screen, a mouse, a keyboard, a touch pad, a joy stick, a track ball or any other input device format.

FIG. 2 is a block diagram of the multiplexed channel transcoder 118, in accordance with an embodiment. The multiplexed channel transcoder 118 includes a multiplexer transcoder 200. The multiplexer transcoder 200 receives data from multiple sources 210-240 and transcodes the data into a single multiplexed streamable channel. Any encoding format could be used by the multiplexer transcoder 200. In the embodiment illustrated in FIG. 2, the data from four sources 210-240 are transcoded into the single channel. However, any number of sources can be transcoded into the single channel. The sources 210-240 may be, for example, television channels received by a set-top box. However, in other embodiments one or more of the sources 210-240 may be an internet based source which is downloaded by the place shifting device 110.

Each source 210-240 is assigned a predefined area of the multiplexed channel. In other words, the multiplexer transcoder 200 encodes each source 210-240 into a fixed location within the streamable channel. FIG. 3 illustrates an exemplary electronic device 120 receiving the multiplexed channel, in accordance with an embodiment. As seen in FIG. 3, each source 300-330 was assigned to a substantially equally sized quadrant on the multiplexed channel. However, the predefined areas of the channel of the multiplexed channel can vary in size. For example, one source may be presented in a larger area of the available channel space (e.g., the top half, the entire left side, or the like), while the other sources are assigned smaller areas of the available channel space.

Because the multiplexed channel requires less bandwidth to transmit to the electronic device 120 than multiple individually encoded channels, the quality of the multiplexed channel can be higher than multiple individually encoded channels. The processor 112 can instruct the multiplexer transcoder 200 to transcode the media from the sources 210-240 at a variable resolution and bit-rate based upon the available upload bandwidth available to the place shifting device 110. As the resolution and bit rate of the multiplexed channel affects all of the sources simultaneously, the multiplexed channel simplifies the optimization of the quality of the media being streamed to the electronic device 120. In other words, rather than having to separately optimize the resolution and bit rate of, for example, four separate encoders, the multiplexer transcoder 200 simultaneously optimizes the multiplexed channel.

In one embodiment, for example, the audio data from each of the sources may be multiplexed into a single audio stream by the multiplexer transcoder 200. The electronic device 120, upon request to play the audio from one of the particular streams, can then demultiplex the audio stream to extract one of the audio signals to play. In another embodiment, for example, the place shifting device 110 may encode all of the audio components from the source separately. As audio data typically consumes significantly less bandwidth and video, sending multiple separate audio streams or the one multiplexed audio stream does not consume a significant portion of the available bandwidth.

FIG. 4 is a flow diagram illustrating a method 400 of operating a multiplexed channel place shifting system 100, in accordance with an embodiment. The method 400 begins when the place shifting device 110 determined two or more sources to multiplex. (Step 410). As discussed above, a user may manually build a multiplex channel by selecting multiple sources to be viewed simultaneously. The sources may also be selected by the place shifting device 110 as part of a channel guide or based upon a user's viewing history, trending sources and the like.

The multiplexer transcoder 200 then transcodes the sources into a single streamable channel. (Step 420). The multiplexer transcoder 200 may utilize any multiplexing technique, including, but not limited to, space-division multiplexing, frequency-division multiplexing, time-division multiplexing, polarization-division multiplexing, orbital angular momentum multiplexing, code-division multiplexing, or the like, to transcode the sources together into the single streamable channel. Any encoding scheme could also be used, including, but not limited to, H.264, HEVC, VP8 or VP9, or the like.

The place shifting device 110 then streams the multiplexed channel to the electronic device 120 using the respective communication systems 116 and 126. (Step 430). As discussed above, the multiplexed channel required less bandwidth than separately encoding and separately streaming multiple sources individually. Furthermore, only one multiplexer transcoder 200 is required to stream the multiple sources, rather than multiple separate encoders, thereby reducing the costs associated with the place shifting device 110.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a device comprising a processor and non-transitory storage, the automated process comprising:
   selecting, by the device, first and second media sources from a plurality of different sources of media available via a network;
   receiving, by the device via the network, first and second media streams from the first and second media sources, respectively, wherein the first media stream comprises a first video stream having a first fixed bit rate and wherein the second media stream comprises a second video stream having a second fixed bit rate, wherein the first and second media streams are received simultaneously by the device;
   transcoding, by the device, the first and second video streams simultaneously received from the first and second media sources into a single video stream that comprises encoded video imagery comprising simultaneous video images extracted from both the first and the second sources in separate first and second portions of the encoded video imagery, respectively, and wherein the transcoding comprises the device simultaneously adjusting the first and second fixed bit rates of the video imagery extracted from the first and second video streams so that the single video stream has a desired third bitrate;
   automatically adapting, by the device, the third bitrate over time based upon a fluctuating amount of bandwidth available to the device via a network connection;
   formatting a single media stream for transmission via the network that comprises the single video stream having the desired third bitrate; and
   transmitting, via the communication system, the single media stream to a remote electronic device via the network connection having the fluctuating amount of bandwidth, wherein the remote electronic device decodes the single media stream to thereby render the single video stream having the encoded video imagery from both the first and second video sources at the third bitrate to a viewer of the remote electronic device, and wherein the simultaneous video images extracted from the first and second media sources are rendered to the viewer in first and second portions of a display.

2. The automated process according to claim 1, wherein the selecting further comprises, receiving, by the processor via the communication system, the selection of the first and second media sources from the remote electronic device.

3. The automated process according to claim 1, wherein the selecting further comprises determining, by the processor, the first and second media sources based upon a viewing history of a user of the remote electronic device.

4. The automated process according to claim 1, wherein the selecting further comprises determining, by the processor, the first and second media sources based upon a channel guide.

5. The automated process according to claim 1, wherein the selecting further comprises determining, by the processor, the first and second media sources based upon trending channels.

6. The automated process according to claim 1, wherein the plurality of sources includes at least four sources of media.

7. The automated process according to claim 1, wherein the transcoding further comprises transcoding each of the first and second media streams to the first and second locations within each presentation frame of the single MPEG video stream, respectively.

8. An automated process to be performed by a device comprising a processor, an interface to a network and a non-transitory data storage, the automated process comprising:
   simultaneously receiving a first video stream at a first fixed bitrate from a first one of the plurality of different sources and a second video stream having a second fixed bitrate from a second one of the plurality of different sources;
   transcoding the simultaneously-received first and second video streams into a single video stream that comprises imagery from the first video stream in a first portion of the combined video stream and imagery from the second video stream in a second portion of the single video stream, wherein the single video stream has a variable output bitrate that varies over time based upon an amount of bandwidth available via the network connection, and wherein the variable output bitrate is automatically adapted from the first and second fixed bitrates of the first and second video streams in real time by the media device in response to changing conditions of the network connection;
   formatting a single media stream for transmission via the network that comprises the single video stream having the variable output bitrate; and
   transmitting the single media stream to a remote electronic device via the network connection, wherein the remote electronic device decodes the single video stream having the variable output bitrate to simultaneously render the first and second imagery of the first and second video streams, respectively, to a viewer of the remote electronic device.

9. The automated process of claim 8 wherein the transcoding further comprises encoding separate audio channels for each of the first and second media sources as parts of the shared single media stream.

10. The automated process of claim 9 wherein the single video stream is a single MPEG video stream that encodes the imagery simultaneously received from the first and second video streams in separate portions of each presentation frame.

11. The automated process of claim 8 wherein the separate audio channels comprises a first audio channel and a second audio channel received from the first and second ones of the plurality of different sources, respectively, and wherein the remote electronic device renders one of the first and second audio channels during the simultaneous rendering of the first and second imagery.

12. A video processing device comprising an interface to a digital network and a processor, wherein the processor is configured to perform an automated process that comprises:
   simultaneously receiving a first media stream having a first audio stream and a first video stream at a first fixed bitrate from a first one of the plurality of different sources and a second media stream having a second audio stream and a second video stream having a second fixed bitrate from a second one of the plurality of different sources;

transcoding the simultaneously-received first and second video streams into a single video stream that comprises imagery from the first video stream in a first portion of the combined video stream and imagery from the second video stream in a second portion of the single video stream, wherein the single video stream has a variable output bitrate that varies over time based upon an amount of bandwidth available via the network connection, wherein the variable output bitrate is automatically adapted from the first and second fixed bitrates of the first and second video streams in real time by the device in response to changing conditions of the network connection;

formatting a single media stream for transmission via the network that comprises each of the first and second audio streams and the single video stream having the variable output bitrate; and transmitting the single media stream video stream to a remote electronic device via the interface, wherein the remote electronic device decodes the single video stream having the variable output bitrate to simultaneously render the first and second imagery of the first and second video streams, respectively, to a viewer of the remote electronic device while a selected one of the first and second audio streams is rendered.

13. The video processing device of claim 12 wherein the transcoding further comprises encoding separate audio channels for each of the first and second media sources as parts of the shared single media stream.

14. The video processing device of claim 13 wherein the single video stream is a single MPEG video stream that encodes the imagery simultaneously received from the first and second video streams in separate portions of each presentation frame.

15. The video processing device of claim 12 wherein the separate audio channels comprises a first audio channel and a second audio channel received from the first and second ones of the plurality of different sources, respectively, and wherein the remote electronic device renders one of the first and second audio channels during the simultaneous rendering of the first and second imagery.

* * * * *